Jan. 11, 1949.                C. H. REYNOLDS                 2,458,642
                              AUTO TIRE CHAIN RING
                              Filed July 17, 1946
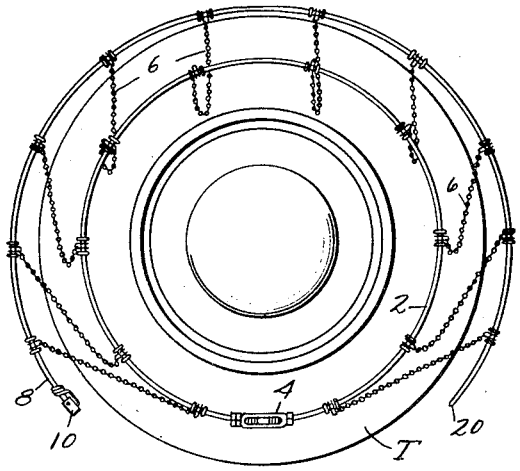
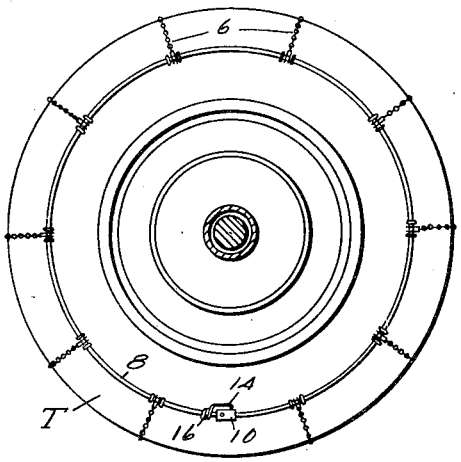
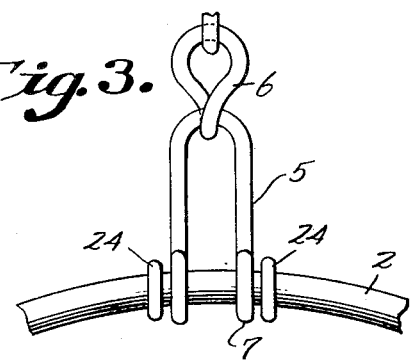
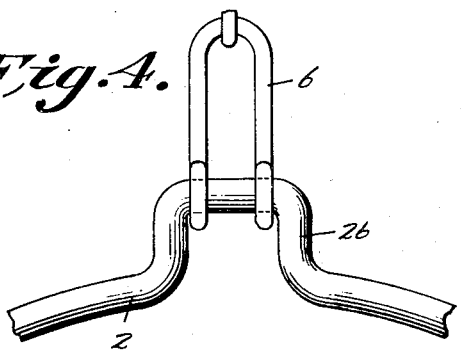
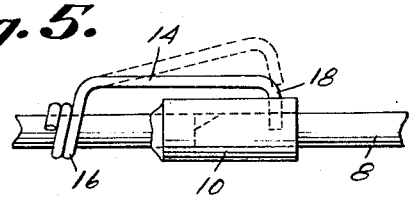
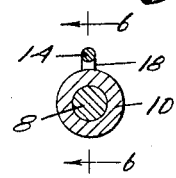
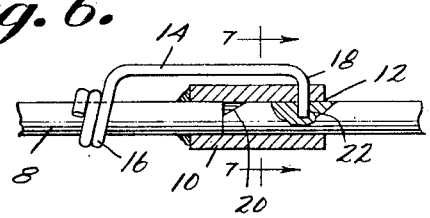
INVENTOR.
Charles H. Reynolds,
BY *Victor J. Evans & Co.*
ATTORNEYS Patented Jan. 11, 1949

2,458,642

UNITED STATES PATENT OFFICE 2,458,642

AUTO TIRE CHAIN RING

Charles H. Reynolds, Donora, Pa., assignor of forty-nine per cent to Peter Girman, Donora, Pa.

Application July 17, 1946, Serial No. 684,320

1 Claim. (Cl. 152—242)

My present invention relates to an improved automobile tire chain, and more particularly to the novel means employed to which the cross chains of an anti-skid device are secured, in place of the conventional chains normally placed about the walls of pneumatic tires.

Generally my invention comprises the use of spring metal rods as anchors for the cross chains, which rods are not only more durable, but which permit the easy mounting and demounting of the chains without the necessity of jacking the wheel, or rocking the automobile back and forth to enable the driver to get the chains under the portion of the tire in contact with the ground.

In the accompanying drawings, I have illustrated one complete example of the physical embodiment of my invention according to the best mode I have thus far devised, but it will be understood that various changes and alterations may be made in the exemplified structure within the scope of the appended claim.

In the drawings:

Figure 1 is a side elevational view of an automobile tire and wheel showing the chain of my invention with the outer rod in position, and the inner rod ready to be secured.

Figure 2 is a side elevational view of the tire and wheel looking at the inside with the chain of my invention mounted and ready for use.

Figure 3 and Figure 4 are detail views of different means employed to retain the cross chain in position.

Figure 5 is a detail view in elevation of the locking means for the inner ring.

Figure 6 is a longitudinal vertical sectional view thereof; and

Figure 7 is a transverse vertical sectional view of the locking means for the inner ring.

Referring now to the drawings in detail wherein like characters indicate like parts, I have illustrated the structure of my invention as embodying an outside ring 2 for mounting on the tire T and preferably made of spring metal, the ends of which are secured by a conventional turnbuckle 4.

The cross chains 6 of normal design and structure connect with the outer ring 2, and also with an inner ring 8 also of spring metal and formed at one end with a sleeve 10 suitably secured thereto and formed with an opening 12 to the interior of the sleeve.

A spring latch 14 is secured by coil 16 to the end of the ring having the sleeve, and the latch is formed with a downwardly bent catch 18 engageable with the opening 12 in the sleeve.

The other end of the ring 8 is beveled as at 20 and notched at 22 so that the end when inserted into the sleeve will raise the catch to permit the passage of the ring end thereunder and the catch will drop into the notch 22 retaining the ends in locked position until released by elevation of the latch.

In Figures 3 and 4, I have illustrated means for retaining the cross chains in position, one of which comprises the securing of collars 24 to the rods and the other means includes the use of offsets 26 in the rings to which the cross chains are secured.

The cross chains 6 are attached to the rings by open U-shaped clevises 5 having eyes 7 that are freely mounted on the rings, the end links of the chains being freely held in the closed ends of the clevises. With the chains connected in this manner, the arms of the clevises 5 are free to bend and twist on the rings to compensate for uneven strains and stresses to which cross chains of non-skid tire chains are subjected in use.

In use, the outer chain rod is assembled with the turn-buckle properly adjusted and the cross-chains so spaced as to permit the proper mounting of the device, and the inner ring is slightly sprung and passed over the tire, the outer ring thus abutting the outer wall of the tire and the cross chains passing over the tread portion. The inner ring is then permitted to spring back to position, and the beveled end is guided into the sleeve to latch the ends.

The chain so mounted will stay in position until released and will not be subject to fly off if one or two cross chains break under wear, since the pull exerted on the cross-chains due to the driving force will be absorbed equally by each side member.

The mounting and demounting of the tire chains according to my invention will be immeasurably simplified and will be such that any driver can mount the chains at a moment's notice without having to elevate the wheels from the ground.

Having thus fully described my invention what I claim as new and desire to secure by Letters Patent is:

In a motor vehicle non-skid tire chain, the combination, which comprises, an outer spring wire ring having a turnbuckle therein for adjusting the diameter thereof, adapted to be positioned against the outer surface of a tire, an inner spring wire ring adapted to be positioned against the inner surface of the tire and having an opening therein with a sleeve mounted on the end at one side of the opening and extended to receive the opposite end, said opposite end having a recess in the inner surface thereof, a spring latch positioned on the end of the ring carrying the sleeve and extending through an opening in the sleeve for locking engagement with the said opposite end of the ring through the recess therein, whereby upon releasing the ring after being spread, the ends are adapted to snap into locking engagement with the said opposite end secured in the sleeve, a plurality of spaced cross chains positioned around the tire connecting the rings, and open clevises for freely connecting the ends of the cross chains to the said rings, said clevises having elongated arms with eyes at the ends of said arms and with the eyes freely positioned on the rings, and said rings having a pair of collars integral therewith and positioned on opposite sides of the clevises with the collars spaced from the outer surfaces of the clevises, wherein substantially free connections are provided between the cross chains and rings to compensate for uneven longitudinal thrust resulting from pull on the said cross chains, and whereby the said cross chains suspend the inner ring in position against the inner surface of the tire so that the ends thereof are positioned to snap into locking engagement when released, thereby eliminating the necessity of manually fastening the inner section of a tire chain on a wheel.

CHARLES H. REYNOLDS.

REFERENCES CITED

The following references are of record in the file of this patent:

UNITED STATES PATENTS

| Number | Name | Date |
| --- | --- | --- |
| 1,248,212 | Walden | Nov. 27, 1917 |
| 1,400,896 | Metars | Dec. 20, 1921 |
| 1,801,159 | Hunter | Apr. 14, 1931 |
| 2,252,778 | Morss | Aug. 19, 1941 |